(12) United States Patent
Jang et al.

(10) Patent No.: US 8,472,748 B2
(45) Date of Patent: Jun. 25, 2013

(54) METHOD OF IMAGE PROCESSING AND IMAGE PROCESSING APPARATUS

(75) Inventors: Soon-geun Jang, Seongnam-si (KR); Baek-kyu Kim, Yongin-si (KR); Rae-hong Park, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 306 days.

(21) Appl. No.: 13/031,743

(22) Filed: Feb. 22, 2011

(65) Prior Publication Data
US 2012/0038800 A1     Feb. 16, 2012

(30) Foreign Application Priority Data
Aug. 16, 2010 (KR) .................. 10-2010-0078855

(51) Int. Cl.
*G06K 9/40* (2006.01)
(52) U.S. Cl.
USPC ........... 382/266; 382/167; 382/274; 382/275; 358/3.26; 358/3.27; 358/518

(58) Field of Classification Search
USPC . 382/167, 260, 266, 269, 274, 275; 358/3.26, 358/3.27, 463, 518, 520
See application file for complete search history.

(56) References Cited

U.S. PATENT DOCUMENTS

| | | | | |
|---|---|---|---|---|
| 7,567,724 | B2 * | 7/2009 | Gomi et al. | 382/261 |
| 7,706,624 | B2 * | 4/2010 | Beazley | 382/260 |
| 7,912,288 | B2 * | 3/2011 | Winn et al. | 382/181 |
| 8,295,632 | B2 * | 10/2012 | Fattal | 382/266 |
| 8,305,397 | B2 * | 11/2012 | Ueno et al. | 345/611 |
| 2009/0041376 | A1 | 2/2009 | Carletta et al. | |

* cited by examiner

*Primary Examiner* — Yosef Kassa
(74) *Attorney, Agent, or Firm* — Drinker Biddle & Reath LLP (57) ABSTRACT

A method of image processing includes: providing a radiance map, generating a first image in which an edge part is preserved and a flat part is smoothed by applying an edge preservation smoothing filter to the radiance map, generating a second image having a visually perceivable dynamic range by applying a correction curve to the first image, and generating a display image having corrected lightness by adjusting a hue value and a chroma value of the second image.

18 Claims, 6 Drawing Sheets

METHOD OF IMAGE PROCESSING AND IMAGE PROCESSING APPARATUS

CROSS-REFERENCE TO RELATED PATENT APPLICATION

This application claims the priority benefit of Korean Patent Application No. 10-2010-0078855, filed on Aug. 16, 2010, in the Korean Intellectual Property Office, the entire disclosure of which is incorporated herein by reference.

BACKGROUND

1. Field of the Invention

Embodiments relate to a method of image processing and an image processing apparatus regarding high dynamic range imaging.

2. Description of the Related Art

High dynamic range imaging (HDRI) allows a luminance range of a real natural image perceived by human eyes to be represented in a digital image. HDRI may have a wide range of applications such as in medical imaging, satellite imaging, physical substrate rendering, digital cinema, and the like. A range of luminance perceivable by human eyes is about $10^8:1$, whereas a range of luminance of a digital image represented by a digital display device is limited to 100:1. Thus, an appropriate conversion technology is required to generate data having a high dynamic range on the digital display device. Such a conversion technology is tone mapping.

Conventional tone mapping methods include a Reinhard tone mapping method, a fast tone mapping method, and an image color appearance method (iCAM06).

However, conventional tone mapping methods cause a global contrast loss or a local contrast loss during the tone mapping process. Furthermore, since the conventional tone mapping methods do not reflect features of human vision, a pixel having a specific chrominance pixel has relatively low lightness.

SUMMARY

Embodiments includes a method of image processing and an image processing apparatus capable of preventing a global contrast loss or local contrast loss and correcting lightness of a display image.

According to an embodiment, a method of image processing includes: providing a radiance map, generating a first image in which an edge part is preserved and a flat part is smoothed by applying an edge preservation smoothing filter to the radiance map, generating a second image having a visually perceivable dynamic range by applying a correction curve to the first image, and generating a display image having corrected lightness by adjusting a hue value and a chroma value of the second image.

The method of image processing may further include extracting a detail component by using a difference between the first image and the radiance map, generating a third image in which the detail component is preserved by summing the detail component and the second image, and generating a display image having corrected lightness by adjusting a hue value and a chroma value of the third image.

The radiance map may be generated from a plurality of low dynamic range images having different exposure levels.

The edge preservation smoothing filter may be a weighted least square (WLS) filter.

The correction curve may be formed by connecting a plurality of minimum values obtained by summing differences between luminance values of pixels included in the radiance map and quantization levels that can be displayed on the second image with respect to all pixels included in the radiance map.

The correction curve may be determined through competitive learning.

The lightness of the display image may be corrected to be greater by adjusting the hue value and the chroma value corresponding to chrominance values in a lab color space of each pixel of the second image.

The display image may have a range of luminance values that can be displayed on a display unit.

The radiance map may have a range of luminance values that cannot be displayed on the display unit.

Another embodiment includes an image processing apparatus. The image processing apparatus includes: a radiance map providing unit that provides a radiance map; a first image generating unit that generates a first image in which an edge part is preserved and a flat part is smoothed by applying an edge preservation smoothing filter to the radiance map; a second image generating unit that generates a second image having a visually perceivable dynamic range by applying a correction curve to the first image; and a display image generating unit that generates a display image having corrected lightness by adjusting a hue value and a chroma value of the second image.

The image processing apparatus may further include: a third image generating unit that extracts a detail component by using a difference between the first image and the radiance map, and that generates a third image in which the detail component is preserved by summing the detail component and the second image, wherein the display image generating unit generates a display image having corrected lightness by adjusting a hue value and a chroma value of the third image.

The radiance map providing unit may generate the radiance map from a plurality of low dynamic range images having different exposure levels.

The edge preservation smoothing filter may be a WLS filter.

The correction curve may be formed by connecting a plurality of minimum values obtained by summing differences between luminance values of pixels included in the radiance map and quantization levels that can be displayed on the second image with respect to all pixels included in the radiance map.

The correction curve may be determined through competitive learning.

The display image generating unit may correct the lightness of the display image to be greater by adjusting the hue value and the chroma value corresponding to chrominance values in a lab color space of each pixel of the second image.

The display image may have a range of luminance values that can be displayed on a display unit.

The radiance map may have a range of luminance values that cannot be displayed on the display unit.

BRIEF DESCRIPTION OF THE DRAWINGS

The above and other features and advantages will become more apparent by describing in detail exemplary embodiments with reference to the attached drawings in which.

DETAILED DESCRIPTION

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. No item or component is essential to the practice of the invention unless the element is specifically described as "essential" or "critical."

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented using algorithms that are executed in one or more processors. Furthermore, the invention could employ any number of conventional techniques for electronics configuration, signal processing and/or control, data processing and the like. Finally, the steps of all methods described herein can be performed in any suitable order unless otherwise indicated herein or otherwise clearly contradicted by context.

For the sake of brevity, conventional electronics, control systems, software development and other functional aspects (and components of the individual operating components) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but can include software routines in conjunction with processors, etc.

Embodiments will be described below in more detail with reference to the accompanying drawings. Those components that are the same or correspond to each other are given the same reference numeral regardless of the figure number, and redundant explanations are omitted.

Figure 1:
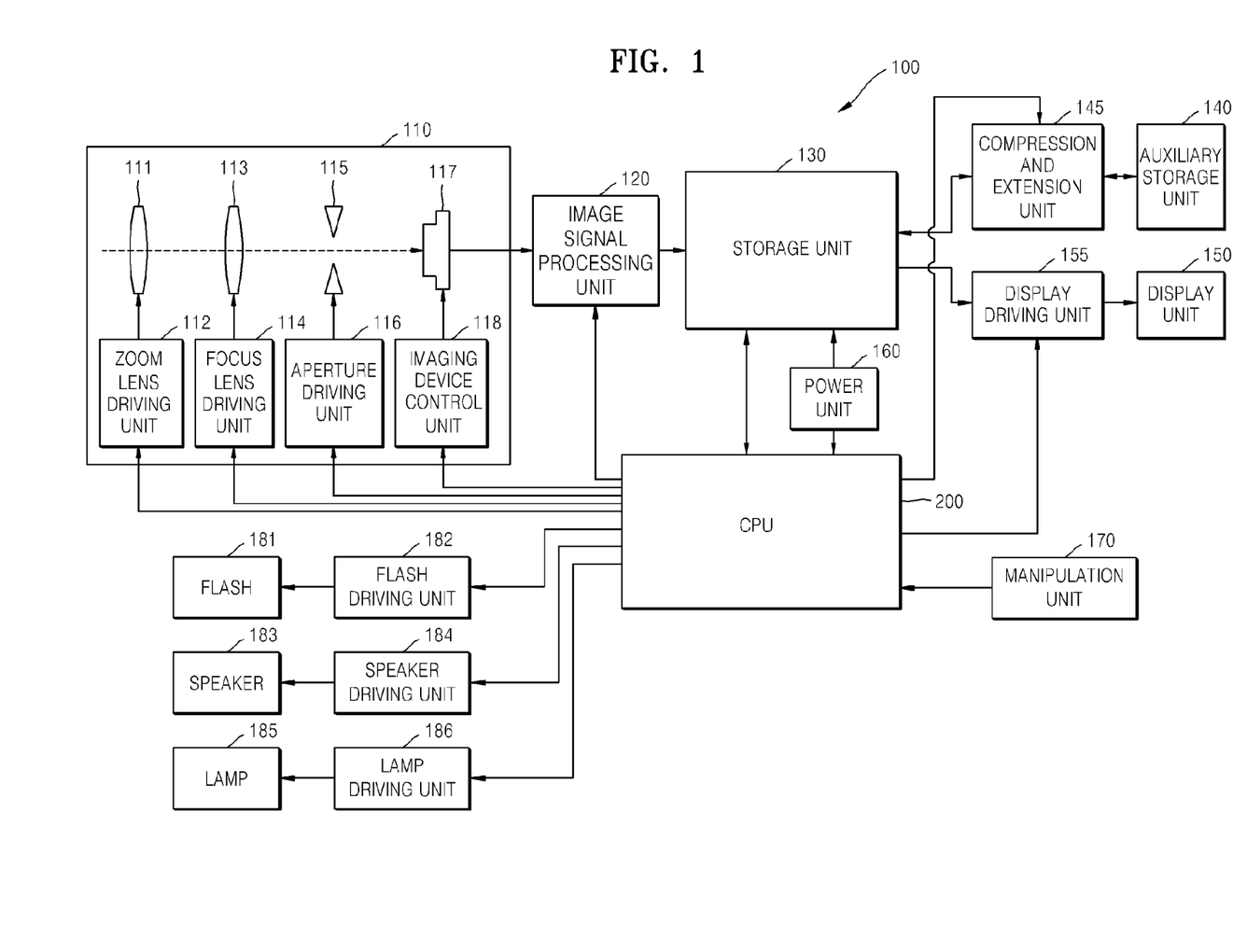
FIG. 1 is a block diagram of an image processing apparatus according to an exemplary embodiment.

FIG. 1 is a block diagram of an image processing apparatus 100 according to an exemplary embodiment. The image processing apparatus 100 of FIG. 1 can be a digital camera. However, the image processing apparatus 100 is not limited to the digital camera, and may be realized as various digital devices, such as, a digital single-lens reflex camera (DSLR), a hybrid camera, and the like. The construction of the image processing apparatus 100 is described in detail below according to an operation thereof.

In connection with a process of capturing an image of a subject, an optical signal of the subject may pass through a zoom lens 111 and a focus lens 113 that may form an optical system of an imaging unit 110. The amount of light can be controlled according to an opening and closing of an aperture 115, and an image of the subject can be formed on a light-receiving surface of an imaging device 117. The image formed on the light-receiving surface of the imaging device 117 can be converted into an electrical image signal through a photoelectric conversion process.

The imaging device 117 may be a charge-coupled device (CCD) image sensor or a complementary metal oxide semiconductor (CMOS) image sensor (CIS) that converts an optical signal into an electrical signal. The aperture 115 can be in a closed state or in an open state when an auto-focusing algorithm is performed according to a first release signal generated by, for example, pressing a release button halfway. The aperture 115 may perform exposure processing according to a second release signal generated by, for example, pressing the release button all the way.

Locations of the zoom lens 111 and the focus lens 113 can be controlled by a zoom lens driving unit 112 and a focus lens driving unit 114, respectively. For example, a wide-angle zoom signal can reduce a focal length of the zoom lens 111, which can widen a viewing angle. Also, for example, a telephoto-zoom signal can increase the focal length of the zoom lens 111, which can narrow the viewing angle. The location of the focus lens 113 can be adjusted after the location of the zoom lens 111 is established, and thus the viewing angle may not be affected by the location of the focus lens 113. The opening of the aperture 115 can be controlled by an aperture driving unit 116. A sensitivity of the imaging device 117 can be controlled by an imaging device control unit 118.

The zoom lens driving unit 112, the focus lens driving unit 114, the aperture driving unit 116, and the imaging device control unit 118 can control the zoom lens 111, the focus lens 113, the aperture 115, and the imaging device 117, respectively, according to one or more results of operations of a CPU 200 with respect to, for example, exposure information, focal information, and the like.

In a process of forming an image signal, an image signal outputted from the imaging device 117 can be outputted to an image signal processing unit 120. If the image signal outputted from the imaging device 117 is an analog signal, the image signal processing unit 120 can convert the analog signal to a digital signal. The image signal processing unit 120 can also perform various image processing on the digital signal converted from the analog signal. The image signal on which image processing is performed can be temporarily stored in a storage unit 130.

More specifically, the image signal processing unit 120 can perform signal processing, such as, auto white balance, auto exposure, gamma correction, etc. to convert image data in accordance with a human's angle of vision, to improve image quality, or to output the image signal having the improved image quality. An image signal processing unit 120 can perform image processing, such as, color filter interpolation, color matrix, color correction, color enhancement, etc.

In particular, the image signal processing unit 120 of the present embodiment may provide a radiance map. The image signal processing unit 120 may generate a first image by applying an edge preservation smoothing filter to the radiance map and may generate a second image having a dynamic range adjusted by applying a correction curve to the first image. The image signal processing unit 120 of the present embodiment may correct lightness of the first and second images. The image signal processing unit 120 may generate a display image that can be displayed on a display unit 150. The operation of the image signal processing unit 120 is described below in more detail with reference to FIGS. 2 and 3.

The storage unit 130 may include a program storage unit (not shown) and a main storage unit (not shown). The program storage unit can store a program regarding an operation of the image processing apparatus 100 irrespective of whether power is supplied or not. The main storage unit can temporarily store the image data and other data while power is supplied.

The program storage unit can store an operating program used to operate the image processing apparatus 100 and various application programs. The CPU 200 can control one or more components of the image processing apparatus 100 according to the programs stored in the program storage unit.

The main storage unit can temporarily store an image signal outputted from the image signal processing unit 120 or an auxiliary storage unit 140.

The main storage unit may be directly connected to a power unit 160 while power is supplied thereto so as to operate the image processing apparatus 100. Thus, an operating program or a code previously stored in the program storage unit may be copied and changed into an executable code so as to facilitate booting of the image processing apparatus 100, and data stored in the main storage unit may be promptly read when the digital camera 100 is rebooted.

The image signal stored in the main storage unit can be outputted to a display driving unit 155. The image signal can be converted into an analog signal and simultaneously can be converted into an image signal in an optimal display manner. The converted image signal can be displayed on the display unit 150 and can be viewed as an image for a user. The display unit 150 can continuously display the image signal obtained by the imaging device 117. The display unit 150 can act as a view finder that can be used to determine a photographing range during a photographing mode. The display unit 150 may use various display devices, such as a liquid crystal display (LCD), an organic light emitting display (OLED), an electrophoresis display device (EDD), etc.

In a process of recording the generated image signal, the image signal can be temporarily stored in the storage unit 130. Various types of information regarding the image signal and the image signal itself can be stored in the auxiliary storage unit 140. The image signal and data are output to a compression and extension unit 145. The compression and extension unit 145 can perform compression processing, i.e. encoding processing such as JPEG, in an optimal storage manner by using a compression circuit. The compression and extension unit 145 can form an image file and can store the image file in the auxiliary storage unit 140.

The auxiliary storage unit 140 may use various types of magnetic storage media, static semiconductor memory, semiconductor memory, or some other suitable data storage device. Magnetic storage media can be, but not limited to, a hard disk drive, a floppy disk, etc. Static semiconductor memory can be, but not limited to, a portable flash memory, etc. Semiconductor memory can be in a card shape or a stick shape, such as a freely attachable card type flash memory.

In a process of reproducing an image, the image file that has been compressed and recorded in the auxiliary storage unit 140 can be outputted to the compression and extension unit 145. The compression and extension unit 145 can perform extension processing, i.e. decoding processing, by using an extension circuit, and an image signal from the image file can be extracted. The image signal can be outputted to the storage unit 130. The image signal can be temporarily stored in the storage unit 130 and may be reproduced as a predetermined image on the display unit 150 through the display driving unit 155.

The image processing apparatus 100 can include a manipulation unit 170 that can receive an external signal from the user. The manipulation unit 170 may include a shutter-release button, a power button, a wide-angle-zoom button, a telephoto-zoom button, and various other function buttons. The shutter-release button can be used to expose the imaging device 117 to light for a predetermined amount of time. The power button can be used to power on and off the image processing apparatus 100. The wide-angle-zoom button and the telephoto-zoom button can be used to widen or narrow a viewing angle according to an input. The remaining function buttons can be used to select a character input mode, a photographing mode, a playback mode, a white balance setup function, an exposure setup function, and the like.

The image processing apparatus 100 can include a flash 181 and a flash driving unit 182 for driving the flash 181. The flash 181 can be a light emitting device for instantly illuminating a subject in a dark location.

A speaker 183 and a lamp 185 may output a sound signal and a light signal, respectively. The speaker 183, the lamp 185, or both the speaker 183 and the lamp 185 can inform the user about an operating state of the image processing apparatus 100. For example, when a photographing condition when the user sets a photographing variable and a photographing condition when the user desires to perform photographing are different from each other during a passive mode, the speaker 183 or the lamp 185 may output a notification signal notifying the user about such a difference as a warning sound or an optical signal. A speaker driving unit 184 may control a type of sound, a volume thereof, etc. of the speaker 183. A lamp driving unit 186 may control whether the lamp 185 emits a light, a time taken for the lamp 185 to emit the light, a type of the light emitted by the lamp 185, etc.

The CPU 200 may process operations according to the operating system and application programs stored in the storage unit 130. The CPU 200 may temporarily store a result of processed operations. The CPU 200 may control the corresponding elements according to the result of processed operations so as to operate the image processing apparatus 100.

The image signal processing unit 120 is described below in more detail with reference to FIGS. 2 and 3.

Figure 2:
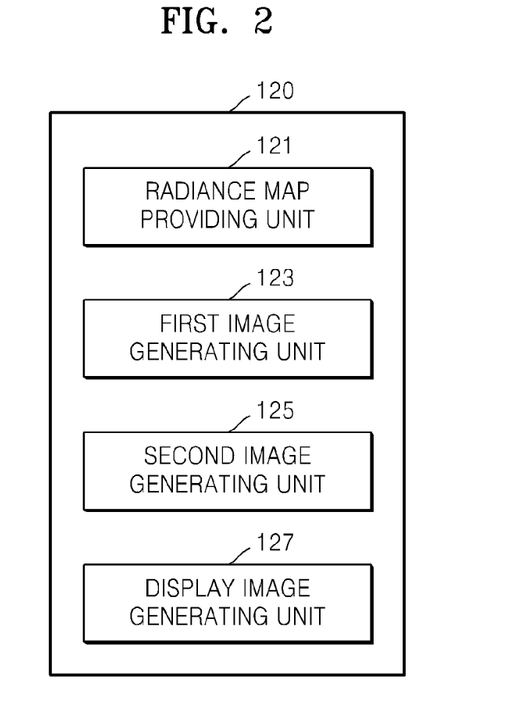
FIG. 2 is a block diagram of an image signal processing unit of FIG. 1 according to an exemplary embodiment.

FIG. 2 is a block diagram of the image signal processing unit 120 according to an exemplary embodiment. Referring to FIG. 2, the image signal processing unit 120 can include a radiance map providing unit 121 that provides a radiance map. The radiance map may refer to a single image obtained from one or more low dynamic range images captured according to different exposure times. A Debevec and Malik method can be used to obtain the radiance map through low dynamic range images. The Debevec and Malik method may be well known in the image processing field, and thus a detailed description of the Debevec and Malik method is omitted. The radiance map can be an image having a range of luminance values that cannot be displayed on the display unit 150. That is, the radiance map can be an image having a high dynamic range (HDR). Therefore, the radiance map must be converted into a display image that can be displayed on the display unit 150.

A first image generating unit 123 can generate a first image by applying an edge preservation smoothing filter to the radiance map provided by the radiance map providing unit 121. An edge part of the first image can be preserved, whereas a flat part thereof can be smoothed. The edge preservation smoothing filter can be used to preserve an edge part of an input image and to smooth a flat part thereof. The flat part may not include a meaningful structure and may be defined as a part including a texture, a fine edge, or no edge. In the present embodiment, the edge preservation smoothing filter may use a weighted least square (WLS) filter. The use of a WLS filter can preserve a detailed image damaged during a tone mapping process. The WLS filter can reduce a difference in an intensity value or a luminance value between pixels neighboring the flat part of the first image. The WLS filter can maintain a difference in an intensity value or a luminance value between pixels neighboring the edge part thereof. Therefore, the detailed image can be preserved by using the WLS filter.

A second image generating unit 125 can generate a second image having a dynamic range perceivable by human eyes by applying a correction curve to the first image generated by the first image generating unit 123. That is, the second image generating unit 125 can reduce a dynamic range of the first image having a visually unperceivable HDR.

Figure 3:
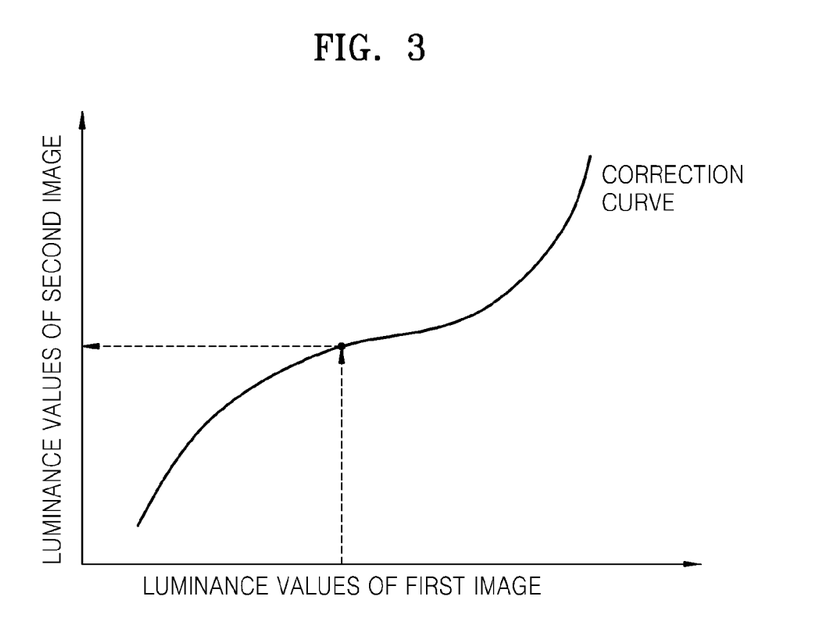
FIG. 3 is a graph of a correction curve according to an exemplary embodiment.

FIG. 3 is a graph of a correction curve according to an exemplary embodiment. Referring to FIG. 3, the correction curve can be used to determine how to map a luminance value of each pixel of the input first image and a luminance value of each pixel of the output second image. The correction curve can be formed by connecting a plurality of minimum values obtained by summing differences between luminance values of pixels included in the radiance map and quantization levels that can be displayed on the second image when the luminance values are converted into the second image with respect to all pixels included in the radiance map. A quantization level can be used to mean a bit depth that can be represented by a display device. Such a method of obtaining the correction curve can be competitive learning. Competitive learning can be used to mean equally learning a codeword by adding a set to a victory frequency number of codewords used to determine the quantization level. The codeword can mean a mapping index used as a log value of a luminance value in the case where a codebook is the number of intensity levels that can be displayed. Furthermore, the equal learning of a codeword can mean an adjustment of spaces between mapping indices for appropriate learning. Competitive learning may be well known technology used for a classification job in the image processing field. In the present embodiment, the competitive learning can be used to generate the correction curve, and thus a detailed description of competitive learning is omitted.

The second image generating unit 125 may generate the second image in which a global contrast is preserved through the correction curve. Although the correction curve can be merely linear, or can be non-linear according to an equation $s=cr^\gamma$ (s: output value, c: positive number, r: input value, wherein $\gamma$ is $0<\gamma<1$), the input value and the output value can be linear or correspond according to the equation above. Thus, a feature value of an input image may be lost due to the correction curve and may not be reflected on an output image. However, the second image generating unit 125 of the present embodiment may generate the correction curve that can preserve a local contrast and can prevent an artifact, such as a halo, by considering the luminance values of the pixels of the radiance map through competitive learning during the process of generating the correction curve. Thus, a global contrast of the second image having a changed dynamic range can be preserved through the correction curve of the present embodiment.

A display image generating unit 127 can generate a display image having corrected lightness by adjusting a hue value and a chroma value of the second image generated by the second image generating unit 125. The display image can have a range of luminance values that can be displayed on the display unit 150. The display image can be obtained by adjusting only a lightness value of a second image having a dynamic range that can be displayed on the display unit 150.

The display image generating unit 127 can correct the lightness of the display image to be greater by adjusting the hue value and the chroma value corresponding to chrominance values in a lab color space (such as a CIELAB color space) of each pixel of the second image. The Helmholtz-Kohlrausch effect can be used to correct lightness as a chromatic function. The CIELAB color space can be related to a chrominance value indicating brightness of a color and a complementary color. The CIELAB color space can be represented in a 3D space. A coordinate of the CIELAB color space may be L (brightness), a (red-green), and b (yellow-blue) that are chrominance components indicating the complementary color. For example, the chroma value $C_{ab}$ can be controlled by adjusting a and b according to Equation 1 below. The chroma value $C_{ab}$ can be defined as a color change between a and b at the same perceivable brightness. Embodiments are not limited to Equation 1 that represents the chroma value according to a component of a color coordinate. Equation 1 may be modified, or other equations may be used.

$$C_{ab}=\sqrt{a^2+b^2} \quad \text{[Equation 1]}$$

Meanwhile, the hue value $h_{ab}$ may be controlled by adjusting a and b according to Equation 2 below. The hue value $h_{ab}$ can indicate a perceivable feature of a color, such as blue, green, yellow, and red. Embodiments are not limited to Equation 2 that can represent the hue value according to a component of the color coordinate. Equation 2 may be modified.

$$h_{ab} = \tan^{-1}\left(\frac{b}{a}\right) \quad \text{[Equation 2]}$$

Figure 4A:
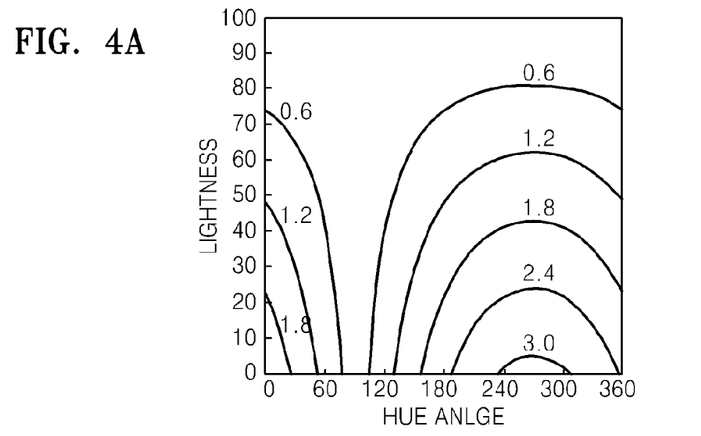
FIGS. 4A through 4C are graphs of relationships between a hue value, a chroma value, and lightness according to an exemplary embodiment.
Figure 4B:
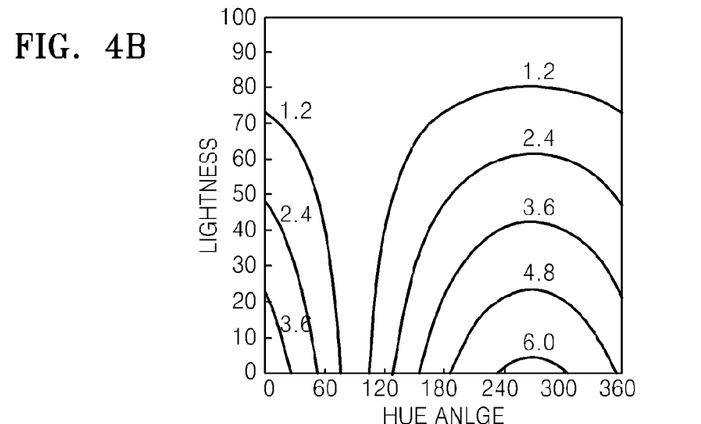
Figure 4C:
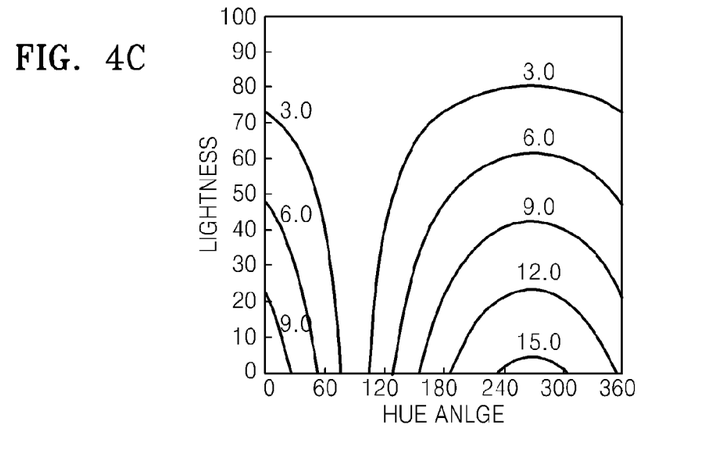

For example, the chroma value and the hue value obtained by using a and b that are the chrominance components of the CIELAB color space of each pixel, and lightness of the display image can be corrected by using the Helmholtz-Kohlrausch effect. When the lightness of the display image is corrected by using the chroma value and the hue value, data including the hue value and the lightness may be used. Example data is shown in graphs of FIGS. 4A through 4C. The graphs of FIGS. 4A through 4C show the relationship between the hue values and the lightness when the chroma value is 10, 20, and 50, respectively. The hue value may be an angle according to equation 2. The display image generating unit 127 can correct the lightness of the display image according to the hue value and chroma value, thereby solving a conventional problem that a chroma and a color tone are blurred when the lightness increases. Thus, the display image generating unit 127 can generate a clear display image.

Figure 5:
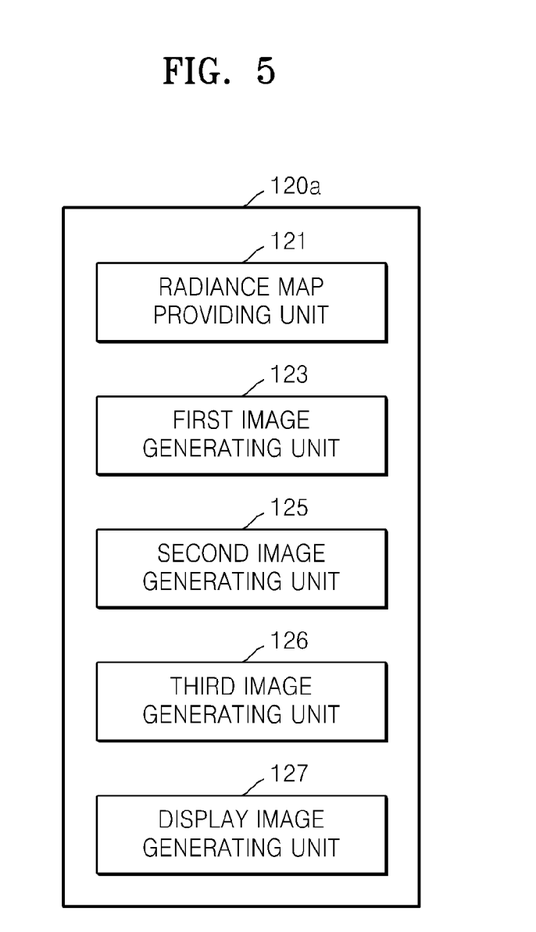
FIG. 5 is a block diagram of an image signal processing unit of FIG. 1 according to another exemplary embodiment.

FIG. 5 is a block diagram of an image signal processing unit 120a according to another exemplary embodiment. The image signal processing unit 120a of FIG. 5 can include the radiance map providing unit 121, the first image generating unit 123, the second image generating unit 125, and the display image generating unit 127. The image signal processing unit 120a of FIG. 5 can be similar to the image signal processing unit 120 of FIG. 2; however, the image signal processing unit 120a of FIG. 5 can further include a third image generating unit 126. In addition, the display image generating unit 127 of the image signal processing unit 120a of FIG. 5 can generate a display image having corrected lightness by adjusting a hue value and a chroma value of a third image generated by the third image generating unit 126, which is different from the image signal processing unit 120 of FIG. 2. The differences between the image signal processing unit 120a of FIG. 5 and the image signal processing unit 120 of FIG. 2 is described in detail below.

The third image generating unit 126 can obtain a detail component through a difference between the first image generated by the first image generating unit 123 and the radiance map generated by the radiance map generating unit 121. The first image can be obtained by applying a WLS filter to the radiance map and can have a smoothed flat part. Thus, a detail component of the flat part of the first image may be obtained by differentiating the first image from the radiance map. The detail component can mean a very small edge component such as a texture. The detail component and the second image generated by the second image generating unit 125 can be combined with each other, thereby generating the third image in which the detail component can be preserved. The third image generating unit 126 can enable an image having a visually perceivable dynamic range in which, in particular, the detail component is preserved, to be obtained. The image signal processing unit 120a can obtain an image in which the detail component and a local contrast are wholly preserved through the third image generating unit 126.

The display image generating unit 127 can correct the lightness of the display image to be increased by adjusting a hue value and a chroma value corresponding to chrominance values in a CIELAB color space of each pixel of the third image generated by the third image generating unit 126.

Figure 6:
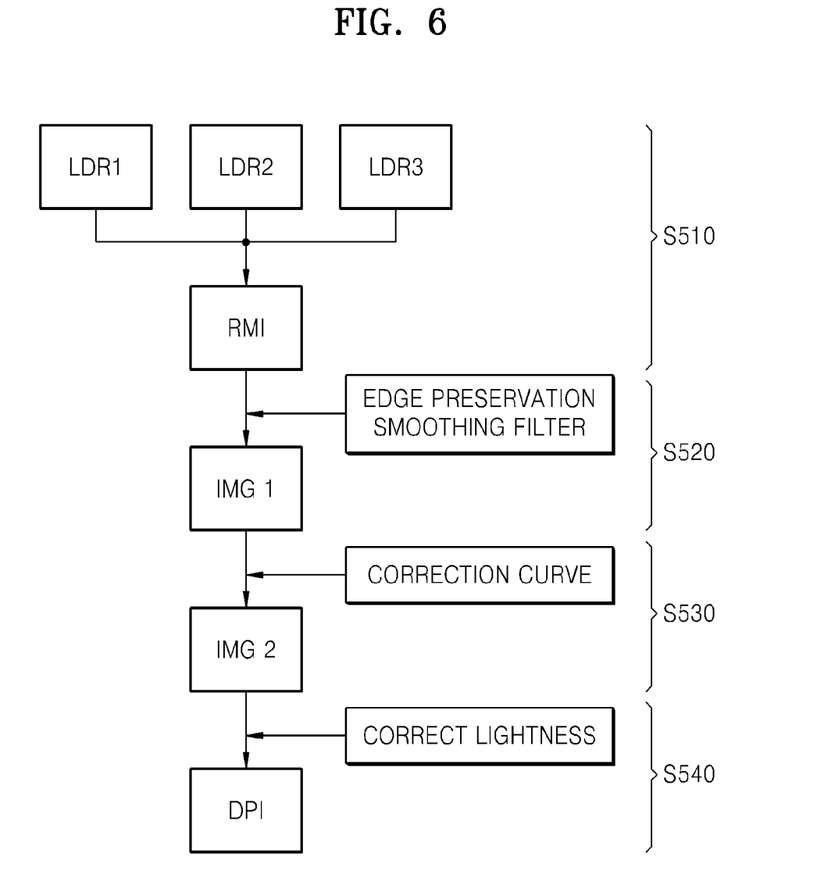
FIG. 6 is a block flow diagram of a method of image processing according to an exemplary embodiment.

FIG. 6 is a block flow diagram of a method of image processing according to an exemplary embodiment. Referring to FIG. 6, in operation 510, a radiance map RMI can be generated by using a plurality of low dynamic range images LDR1, LDR2, and LDR3 having different exposure levels. Operation 510 can be the same as described with reference to the radiance map providing unit 121 and thus a description thereof is not repeated here.

In operation 520, a first image IMG1 can be generated by applying an edge preservation smoothing filter to the radiance map RMI. The edge preservation smoothing filter may be a WLS filter. An edge part of the first image IMG1 can be preserved, whereas a flat part thereof can be smoothed. A detail image can be preserved by using the WLS filter. A method of preserving a local contrast of an image is described below in more detail with reference to FIG. 6.

In operation 530, a second image IMG2 can be generated by applying a correction curve to the first image IMG1. The correction curve can be used to change the first image IMG1 having a global dynamic range into the second image IMG2 having a visually perceivable dynamic range. The correction curve may not be a linear curve or can be a nonlinear curve having a predetermined equation and can be a curve generated through competitive learning. More specifically, the correction curve can be formed by connecting a plurality of minimum values, which can be obtained by summing differences between luminance values of pixels included in the radiance map RMI and luminance values for determining quantization levels when the luminance values are converted into the second image IM2 with respect to all pixels included in the radiance map RMI. Therefore, the correction curve of the present embodiment may reflect a general feature of an image and can reduce a dynamic range by using a luminance value of each pixel of the image, thereby preserving a local contrast of the image.

In operation 540, a display image DPI can be generated by correcting lightness of the second image IMG2. The display image DPI can have a dynamic range that can be displayed on a display unit, such as display unit 150. The lightness of the second image IMG2 can be corrected by reflecting a hue value and a chroma value of the second image IMG2. For example, according to Equations 1 and 2 above, the hue value and the chroma value with respect to pixel chrominance can be obtained, and the lightness of the second image IMG2 can be corrected according to the hue value and the chroma value, thereby solving a conventional problem that a chroma and a color tone are blurred when the lightness increases.

The display image DPI can be displayed on the display unit 150.

Figure 7:
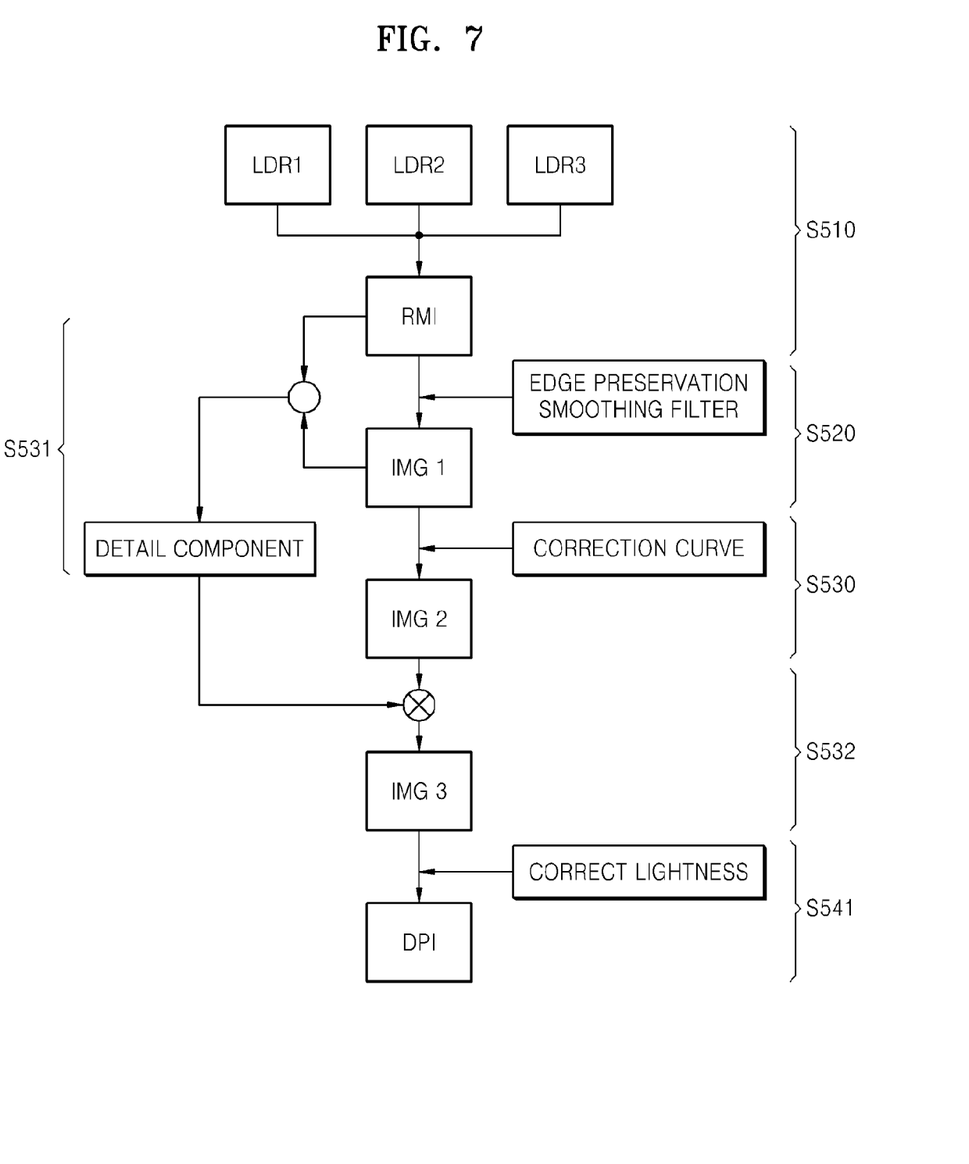
FIG. 7 is a block flow diagram of a method of image processing according to another exemplary embodiment.

FIG. 7 is a block flow diagram of a method of image processing according to another exemplary embodiment. Although the method of image processing of FIG. 7 is similar to the method of image processing of FIG. 6 for the most part, the method of image processing of FIG. 7, which preserves a local contrast of an image by generating a detail component, can be different from the method of image processing of FIG. 6. The differences between the method of image processing of FIG. 7 and the method of image processing of FIG. 6 are described below.

Referring to FIG. 7, in operation 531, a detail component can be generated through a difference between the radiance map RMI and the first image IMG1. The first image IMG1 can have a smoothing flat part, and thus the detail component remains if the first image IMGI is differentiated from the radiance map RMI. The detail component can be a delicate edge component like a texture.

In operation 532, a third image IMG3 can be generated by summing the detail component and the second image IMG2. Thus, the detail component can be included in the third image IMG3, thereby preserving a local contrast.

In operation 541, the display image DPI can be generated by correcting lightness of the third image IMG3 according to a hue value and a chroma value similar to operation 540 of FIG. 6.

The present embodiment can preserve a local contrast by using an edge preservation smoothing filter and extracting and utilizing a detail component. The present embodiment can preserve a global contrast by using a correction curve generated by using differences between luminance values of pixels included in a radiance map and luminance values used to determine quantization levels.

For example, the present embodiment can correct lightness of an image in which a visual feature of a human is reflected by adjusting a hue value and a chroma value. Thus, the lightness of the image can increase, thereby preventing a chroma and a color tone from being blurred.

The display image DPI of the present embodiment on which image processing can be performed and a contrast image CI of the present embodiment on which image processing might not be performed can be distinguished from each other as follows. One or more images can be obtained by photographing a Macbeth color chart partitioned by 18 different color boxes according to different exposure levels. The images can be low dynamic range images. The display image DPI can be obtained by performing the image processing of the present embodiment on the low dynamic range images. The contrast image CI can be obtained by performing conventional image processing on the low dynamic range images. The conventional image processing may include tone mapping methods such as a Reinhard tone mapping method, a fast tone mapping method, and an image color appearance method (iCAM06). In addition, the conventional image processing can include a method of correcting lightness irrespective of hue and chroma.

The low dynamic range images can be compared to the display image DPI and the contrast image CI in terms of variations of lightness, hue, and chroma values. For example, locations according to lightness, hue, and chroma of a first pixel included in the display image DPI can be indicated at a 3D coordinate of lightness, hue, and chroma. Furthermore, locations according to lightness, hue, and chroma of a 1' pixel of each of the low dynamic range images corresponding to the first pixel can also be indicated in the 3D coordinate of lightness, hue, and chroma. If such an operation is repeatedly performed on all pixels of the low dynamic range images that are compared to the display image DPI, when the lightness improves from the low dynamic range images to the display image DPI, an increase or reduction in the hue and chroma can be recognized. Such a process can be performed on the contrast image CI in the same manner.

In the display image DPI obtained by performing the image processing of the present embodiment, since the lightness can be corrected in consideration of the hue and chroma, the hue and chroma can increase when the lightness improves. However, in the contrast image CI obtained by performing conventional image processing, since lightness is not corrected in consideration of hue and chroma, variations of the hue and chroma can be different from those of the display image DPI when the lightness improves. Therefore, it can be confirmed that the display image DPI is obtained by performing the image processing of the present embodiment.

The present embodiment can preserve a local contrast by using an edge preservation smoothing filter and extracting and utilizing a detail component, and can preserve a global contrast by using a correction curve generated by using differences between luminance values of pixels included in a radiance map and luminance values used to determine quantization levels.

In particular, the present embodiment can correct the lightness of an image in which a visual feature of a human is reflected by adjusting a hue value and a chroma value. Thus, the lightness of the image can increase, thereby preventing a chroma and a color tone from being blurred.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media, random-access memory (RAM), read-only memory (ROM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains can easily implement functional programs, codes, and code segments for making and using the invention.

The invention can also be embodied as computer-readable code on a computer-readable storage medium. The computer-readable storage medium is any data storage device that can store data which can be thereafter read by a computer system. Examples of the computer-readable storage medium include read-only memory (ROM), random-access memory (RAM), CD-ROMs, magnetic tapes, floppy disks, optical data storage devices, etc. The computer-readable storage medium can also be distributed over network coupled computer systems so that the computer-readable code is stored and executed in a distributed fashion. Also, functional programs, codes, and code segments for accomplishing embodiments of the present invention can be easily programmed by programmers of ordinary skill in the art to which the present invention pertains.

The use of any and all examples, or exemplary language (e.g. "such as") provided herein, is intended merely to better illuminate the invention and does not post a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the appended claims, and all differences within the scope will be construed as being included in the present invention.

What is claimed is:
1. A method of image processing comprising:
providing a radiance map;
generating a first image in which an edge part is preserved and a flat part is smoothed by applying an edge preservation smoothing filter to the radiance map;

generating a second image having a visually perceivable dynamic range by applying a correction curve to the first image; and generating a display image having corrected lightness by adjusting a hue value and a chroma value of the second image.

2. The method of image processing of claim 1, further comprising:

extracting a detail component by using a difference between the first image and the radiance map;

generating a third image in which the detail component is preserved by summing the detail component and the second image;

generating a display image having corrected lightness by adjusting a hue value and a chroma value of the third image.

3. The method of image processing of claim 1, wherein the radiance map is generated from a plurality of low dynamic range images having different exposure levels.

4. The method of image processing of claim 1, wherein the edge preservation smoothing filter is a weighted least square (WLS) filter.

5. The method of image processing of claim 1, wherein the correction curve is formed by connecting a plurality of minimum values obtained by summing differences between luminance values of pixels included in the radiance map and quantization levels that can be displayed on the second image with respect to all pixels included in the radiance map.

6. The method of image processing of claim 1, wherein the correction curve is determined through competitive learning.

7. The method of image processing of claim 1, wherein the lightness of the display image is corrected to be greater by adjusting the hue value and the chroma value corresponding to chrominance values in a lab color space of each pixel of the second image.

8. The method of image processing of claim 1, wherein the display image has a range of luminance values that can be displayed on a display unit.

9. The method of image processing of claim 1, wherein the radiance map has a range of luminance values that cannot be displayed on the display unit.

10. An image processing apparatus, comprising:

a radiance map providing unit that provides a radiance map;

a first image generating unit that generates a first image in which an edge part is preserved and a flat part is smoothed by applying an edge preservation smoothing filter to the radiance map;

a second image generating unit that generates a second image having a visually perceivable dynamic range by applying a correction curve to the first image; and a display image generating unit that generates a display image having corrected lightness by adjusting a hue value and a chroma value of the second image.

11. The image processing apparatus of claim 10, further comprising:

a third image generating unit that extracts a detail component by using a difference between the first image and the radiance map, and that generates a third image in which the detail component is preserved by summing the detail component and the second image, wherein the display image generating unit generates a display image having corrected lightness by adjusting a hue value and a chroma value of the third image.

12. The image processing apparatus of claim 10, wherein the radiance map providing unit generates the radiance map from a plurality of low dynamic range images having different exposure levels.

13. The image processing apparatus of claim 10, wherein the edge preservation smoothing filter is a WLS filter.

14. The image processing apparatus of claim 10, wherein the correction curve is formed by connecting a plurality of minimum values obtained by summing differences between luminance values of pixels included in the radiance map and quantization levels that can be displayed on the second image with respect to all pixels included in the radiance map.

15. The image processing apparatus of claim 10, wherein the correction curve is determined through competitive learning.

16. The image processing apparatus of claim 10, wherein the display image generating unit corrects the lightness of the display image to be greater by adjusting the hue value and the chroma value corresponding to chrominance values in a lab color space of each pixel of the second image.

17. The image processing apparatus of claim 10, wherein the display image has a range of luminance values that can be displayed on a display unit.

18. The image processing apparatus of claim 10, wherein the radiance map has a range of luminance values that cannot be displayed on the display unit.

* * * * *